United States Patent
Nimbalker et al.

(10) Patent No.: US 8,422,439 B2
(45) Date of Patent: Apr. 16, 2013

(54) APPARATUS AND METHOD FOR COMMUNICATING CONTROL INFORMATION OVER A DATA CHANNEL IN THE ABSENCE OF USER DATA

(75) Inventors: Ajit Nimbalker, Arlington Heights, IL (US); Robert T. Love, Barrington, IL (US); Vijay Nangia, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 778 days.

(21) Appl. No.: 12/347,132

(22) Filed: Dec. 31, 2008

(65) Prior Publication Data

US 2010/0165931 A1 Jul. 1, 2010

(51) Int. Cl.
*H04W 4/00* (2009.01)
*H04K 1/10* (2006.01)

(52) U.S. Cl.
USPC .......................................... 370/329; 375/260

(58) Field of Classification Search .................. None
See application file for complete search history.

(56) References Cited

U.S. PATENT DOCUMENTS

| | | | |
|---|---|---|---|
| 2009/0185638 A1* | 7/2009 | Imamura et al. | 375/298 |
| 2011/0021232 A1* | 1/2011 | Kazmi et al. | 455/509 |
| 2011/0038266 A1* | 2/2011 | Kim et al. | 370/242 |
| 2011/0143766 A1* | 6/2011 | Sun et al. | 455/452.2 |

OTHER PUBLICATIONS

3GPP TSG RAN WG1 Meeting #53; R1-081852; Kansas City, MO, USA; May 5-9, 2008; 3 pages.

* cited by examiner

*Primary Examiner* — John Blanton

(57) ABSTRACT

An apparatus and method for communicating control information (e.g., CQI, rank, and/or ACK/NACK) over a data channel (e.g., PUSCH) in the absence of user data includes storing a reference block size for transmission of control information of a first type (e.g., CQI) in memory of a wireless communication device. The reference block size is based on a predetermined quantity of information bits for the first type of control information. Responsive to a scheduling message containing an allocation of data channel transmission resources, the wireless device determines a quantity of the allocated resources to be encoded with control information of a second type (e.g., rank or ACK/NACK). The wireless device may further determine a quantity of the allocated resources to be encoded with control information of the first type and multiplex the encoded control information of the first and second types into a subframe for transmission over the data channel.

20 Claims, 7 Drawing Sheets

APPARATUS AND METHOD FOR COMMUNICATING CONTROL INFORMATION OVER A DATA CHANNEL IN THE ABSENCE OF USER DATA

FIELD OF THE INVENTION

The present invention relates generally to wireless communication networks and, more particularly, to an apparatus and method for communicating control information over a data channel in such a network in situations in which control information, but not user data, is to be communicated.

BACKGROUND

Wireless communication networks are well known. Some networks are completely proprietary, while others are subject to one or more standards to allow various vendors to manufacture equipment for a common system. One such standards-based network is the Universal Mobile Telecommunications System (UMTS). UMTS is standardized by the Third Generation Partnership Project (3GPP), a collaboration between groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA standard, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a data stream. The subcarriers may be contiguous or discontiguous and the downlink data modulation may be performed using quadrature phase shift-keying (QPSK), 16-ary quadrature amplitude modulation (16 QAM), or 64 QAM.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or preceding) followed by subcarrier mapping to a conventional OFDM modulator. The use of DFT preceding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources; preceding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

To facilitate demodulation of uplink transmissions and measurement of uplink channel conditions, the UE typically transmits reference symbols in each uplink subframe. The reference symbols are multiplexed together with the control information (e.g., CQI and rank information) and any data to be sent by the UE on the uplink data channel (referred to as the physical uplink shared channel (PUSCH)). According to the E-UTRA standard, the UE may also transmit hybrid automatic repeat request acknowledgments (HARQ-ACK) acknowledging receipt of prior data transmission from the eNB to the UE (also referred to as downlink data transmission). In a Frequency Division Duplex (FDD) implementation, the UE transmits the HARQ-ACK in a subframe for a prior data transmission from the eNB to the UE sent four milliseconds earlier. For a Time Division Duplex (TDD) implementation, the timing relationship between the downlink data transmission and the corresponding uplink HARQ-ACK transmission may be different. Such HARQ-ACKs, when transmitted, form part of the control information transmitted in an uplink subframe.

In the absence of uplink data to be sent, a UE may transmit uplink control information on an uplink control channel, such as a physical uplink control channel (PUCCH). Control signaling on the PUCCH is transmitted in a reserved frequency region near the edges of a carrier band. Multiple PUCCHs (e.g., for HARQ-ACK, CQI, scheduling requests, etc.) are assigned per resource for different UEs using orthogonal coding. However, in some cases according to the E-UTRA standard, uplink control information must be transmitted over an uplink data channel instead of an uplink control channel either together with data or in the absence of data.

The procedure for modulating and coding of the uplink control information when accompanying the transmission of data is based on the MCS employed for the data as instructed by the eNB in a scheduling grant message. In other words, the MCS for the control information is based on the MCS for the particular data accompanying the control information. The linkage between the data MCS and the control information MCS is given by Contribution R1-081852 to the 3GPP Radio Access Network (RAN) Working Group 1 (3GPP RAN1) as the following equation (Equation 1):

$$M_{ctrl} = \left\lceil \frac{N \cdot \frac{CR}{M_{Mod}}}{10^{\frac{-offset\_dB}{10}}} \right\rceil,$$

where $M_{ctrl}$ is the number of control symbols per transmit time interval (TTI) (e.g., a 1 ms subframe); offset_dB is the performance difference between a given control channel and a PUSCH in decibels (dB); N is the number of control signaling bits (for a given control signaling type); CR is the inverse coding rate of a given PUSCH MCS (e.g., 3/1); $M_{Mod}$ is the number of (uncoded) bits per symbol of PUSCH MCS (e.g., 2, 4 or 6) based on the uplink modulation (e.g., QPSK, 16 QAM, 64 QAM); and the function ($\lceil \cdot \rceil$) rounds the control channel size to the nearest supported integer value towards positive infinity. The supported integers are based on the coding/repetition/puncturing assumptions made for given control signaling on the PUSCH. While Equation 1 provides the underlying principles for determining the control MCS based on the data MCS, the formula has been modified (although not substantially) and simplified in the final version adopted in the E-UTRA standard.

FIG. 1 illustrates a logical block diagram for channel coding and multiplexing functions performed by a processor 100 in an E-UTRA UE to generate a subframe 113 for transmission of control information and data over a PUSCH in accordance with the linkage specified in Equation 1 above. The processor 100 includes, among other things, channel coding blocks 101, 103, 105, 107 for the uplink data and for each respective portion of control information (e.g., CQI, rank, and ACK/NACK). The processor 100 also includes coding blocks for uplink reference symbols and for any other included control information; however, the coding and multiplexing for the reference symbols and other types of control information have been omitted from FIG. 1 for simplicity and clarity.

In accordance with the E-UTRA standard, to request uplink data from a UE, the eNB transmits a scheduling message (e.g., a scheduling grant message) via downlink control information (DCI) on a downlink control channel (e.g., a physical downlink control channel (PDCCH)) providing parameters for the uplink transmission. The parameters provided by the eNB for use in generating the uplink subframe include data modulation format, resource allocation (e.g., resource blocks and position within overall system bandwidth), power control information, and other control information. In the event that the eNB requires aperiodic or as-requested CQI reporting by the UE, the other control information would include a one bit CQI reporting request.

Based on the parameters supplied in the scheduling grant message, the UE creates a data-carrying SC-FDMA subframe according to the linkage provided in Equation 1. According to the E-UTRA standard, each subcarrier of an assigned uplink resource block is divided in time elements referred to as "resource elements." A typical resource block has a bandwidth of 180 kHz and includes 12 subcarriers per 1 ms subframe. The resource elements contain encoded SC-FDMA symbols spread across the subcarriers, such that a typical subframe includes 14 SC-FDMA symbols. Two of the 14 symbols are reference or pilot symbols used for demodulation of the uplink channel by the eNB and/or determining uplink channel quality. Additionally, the UE may also transmit a sounding reference signal (SRS) on one of the 14 symbols which is not associated with uplink data and/or control transmission. The SRS, when transmitted, is primarily used for channel quality determination to enable frequency selective scheduling on the uplink. The remaining 12 symbols (or 11 if SRS is present) per subframe are encoded with the uplink data and control information. The encoding of the control information and the multiplexing of the encoded control information into the subframe is based on the MCS for the data, which was supplied by the eNB in the scheduling grant message, as set forth in Equation 1.

As illustrated in FIG. 1, the uplink data and its associated error correction information are encoded by channel coding block 101 according to the data MCS supplied in the scheduling grant message. The CQI and its associated error correction information are encoded according to Equation 1 by channel coding block 103. Similarly, the rank information, when included, is encoded according to Equation 1 by channel coding block 105. Further, ACK/NACK information, when included, is encoded according to Equation 1 by channel coding block 107. The encoded uplink data and encoded CQI are multiplexed by multiplexing block 109 and provided to the channel multiplexing block 111. The channel multiplexing block 111 then multiplexes the multiplexed encoded data and CQI together with the encoded rank and ACK/NACK information onto the subcarriers of the resource block according to a predetermined multiplexing procedure that is based on the data MCS. The channel multiplexing block 111 produces the uplink data channel subframes 113. An exemplary subframe 113 is illustrated in FIG. 2.

As shown in FIG. 2, the exemplary subframe 113 includes a resource block of twelve subcarriers ($sub_0$ through $sub_{11}$), each of which is divided into fourteen time segments ($t_0$ through $t_{13}$). Each time segment on a particular subcarrier is a resource element 301. The subframe 113 is further broken into two equal time slots (Slot 0 and Slot 1). Each resource element 301 includes a portion of the encoded uplink data (denoted "D" in the exemplary subframe 113), a portion of a particular type of encoded control information (denoted "C" for CQI, "RI" for rank information, and "AN" for ACK/NACK information in the exemplary subframe 113), or a portion of a reference symbol (denoted "RS" in the exemplary subframe 113). The set of resource elements 301 spread across all 12 subcarriers during a particular segment of time forms an SC-FDMA symbol.

The channel multiplexing block 111 typically forms the subframe 113 by first inserting the reference symbols as the fourth symbol of each time slot of the subframe. After the reference symbols have been inserted, the rank information, when included, is inserted into resource elements 301 commencing at the lowest frequency subcarrier edge ($sub_0$) of the subframe 113 and continuing across each subcarrier in the second, sixth, ninth, and thirteenth symbols of the subframe 113 until all the encoded rank information has been added to the subframe 113. Thereafter, the CQI information is inserted into unoccupied resource elements 301 commencing at the highest frequency subcarrier edge ($sub_{11}$) of the subframe 113 and continuing across each subcarrier in every symbol of the subframe 113, except for the fourth and eleventh symbols (which contain the reference symbols) and avoiding the subcarriers occupied by the rank information, until all the encoded CQI information has been added to the subframe 113. Following insertion of the CQI information, the encoded data is added to the subframe 113 into all the remaining, unoccupied resource elements 301. If encoded ACK/NACK information is to be transmitted, such information is thereafter added to the subframe 113 in the resource elements 301 forming some or all of the symbols positioned between the reference symbols and the symbols containing the rank information (i.e., the third, fifth, tenth and twelfth symbols of the subframe 113), commencing at the lowest frequency subcarrier edge ($sub_0$) of the subframe 113. Thus, the added ACK/

NACK information overwrites or purges the data bits and potentially the CQI information located in the resource elements that are overwritten with the ACK/NACK information. However, forward error correction applied to the data bits and the CQI information enables recovery of the data and, if applicable, the CQI at the eNB.

Thus, as detailed above, the E-UTRA standard requires that a data MCS be provided in a scheduling grant message scheduling transmission of data on a PUSCH and further provides for linkage of the data MCS to the MCS for the respective control information accompanying the data on the PUSCH. However, the standard does not address which MCS should be used for transmission of uplink control information in the absence of data when the transmission of such control information is scheduled (e.g., aperiodically) over the PUSCH by the eNB.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention.

Figure 1:
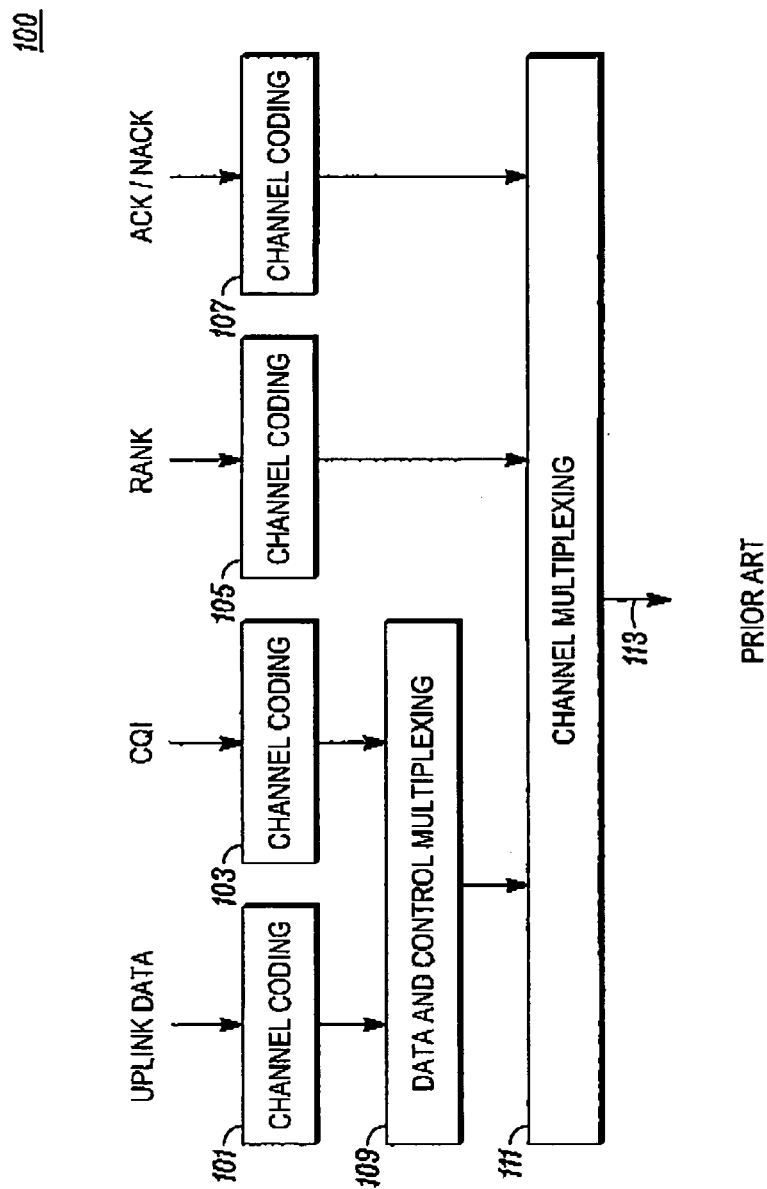
FIG. 1 is a logical block diagram for channel coding and multiplexing functions performed by a processor in an E-UTRA wireless communication device to generate an SC-FDMA subframe for transmission of control information and data over a PUSCH in accordance with the E-UTRA standard.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present invention.

DETAILED DESCRIPTION

Generally, the present invention encompasses an apparatus and method for communicating control information over a data channel in the absence of user data. In accordance with one embodiment, the apparatus is a wireless communication device that includes, inter alia, memory, a receiver, a processor, and a transmitter. The memory is operable to store a reference block size for transmission of control information of a first type, such as channel quality information (e.g., a channel quality indicator (CQI)). The reference block size is based at least on a predetermined quantity of information bits (which may include error correction bits) for the first type of control information. The memory may also store other information, such as, for example, address information for the wireless communication device and programming instructions executable by the processor.

The receiver is operable to receive a scheduling message from a base station. The scheduling message includes a resource allocation indicator and a request for control information of the first type. The resource allocation indicator identifies a set of transmission resources which have been allocated by the base station for transmitting control information. In other words, the resource allocation indicator identifies a resource allocation, such as, for example, a resource block size. In one embodiment, the scheduling message excludes instructions for determining which or how many transmission resources of the resource allocation should be used to transmit control information of various types. That is, the scheduling message may exclude a coding scheme for the control information, as would likely be the case in a scheduling grant message sent by an eNB scheduling transmission of uplink control information over a PUSCH in the absence of user data in an E-UTRA system.

The processor is operable to determine whether control information of a second type is to be sent in response to the scheduling message. Control information of the second type is different than control information of the first type. For example, control information of the second type may be a rank indication for a MIMO antenna system, hybrid automatic repeat request acknowledgment (e.g., HARQ-ACK) information (e.g., positive ACK or negative ACK), some other acknowledgment, or any other control information that is different than the control information of the first type. In the event that control information of the second type is to be sent, the processor is further operable to determine, based on the reference block size and a predetermined modulation to be used for transmitting control information of the first type, a quantity or set of transmission resources from the resource allocation for use in transmitting the control information of the second type. The processor is further operable to encode the control information of the second type into the set of transmission resources determined therefor. The transmitter is operable to transmit at least the transmission resources containing the control information of the second type over the data channel.

In a further embodiment, the processor is also operable to determine, based on the reference block size, the predetermined modulation, and the set of transmission resources determined for the second type of control information, a quantity or set of transmission resources from the resource allocation for use in transmitting requested control information of the first type. In such an embodiment, the processor is further operable to encode the requested control information of the first type into the set of transmission resources determined therefor and multiplex the transmission resources containing the control information of the first and second types into a subframe of the data channel (e.g., a physical uplink shared channel (PUSCH) in an Evolved UMTS Terrestrial Radio Access (E-UTRA) system). The transmitter in such an embodiment is operable to transmit at least the subframe over the data channel.

In an alternative embodiment, the apparatus may be a base station operable to receive, demultiplex, and decode various types of control information communicated by a wireless communication device over an uplink data channel in the absence of user data. In such an embodiment, the base station includes, inter alia, a transmitter, memory, a receiver, and a processor. The transmitter is operable to transmit to the wireless communication device a scheduling message that includes a resource allocation and a request for control information of a first type. The memory is operable to store a reference block size for control information of a first type. The reference block size is based at least on a predetermined quantity of information bits (which may include error correction bits) for the first type of control information.

The base station receiver is operable to receive a transmission from the wireless communication device over the uplink data channel responsive to the scheduling message. The transmission includes at least control information of the first type and control information of a second type.

The base station processor is operable to determine, based on the reference block size, the resource allocation, and a predetermined uplink modulation, a quantity or set of transmission resources from the resource allocation which were used by the wireless communication device to transmit the control information of the second type. The base station processor is also operable to determine, based on the reference block size, the predetermined modulation, the resource allocation, and the set of transmission resources containing control information of the second type, a quantity or set of transmission resources from the resource allocation which were used by the wireless communication device to transmit the control information of the first type. The base station processor is further operable to demultiplex a subframe of the received transmission according to the sets of transmission resources containing the first and second types of control information to obtain respective sets of received resources, and to decode each set of received resources to recover the control information of the first and second types, respectively.

By storing a reference block size at the wireless communication device and linking the reference block size to a particular type of control information (e.g., CQI), the present invention enables the wireless communication device to determine and use a coding scheme for coding various types of control information into a subframe of a data channel in the absence of user data on the data channel. Use of a reference block size together with the base station's resource allocation enables the wireless communication device to create a reference modulation and coding scheme (MCS) against which MCS' for various types of control information can be determined and used to convey the control information in subframes over the data channel. When control information is conveyed with user data on an uplink data channel, such as a PUSCH in an E-UTRA system, the wireless communication device can use the MCS for the user data to assist with coding and multiplexing the control information into the data channel subframes. However, when user data is not scheduled for transmission over the data channel, no data MCS is provided by the base station and, therefore, no reference MCS exists for coding and multiplexing the control information. By also storing the reference block size at the base station, the base station can, on its own, determine the MCS' used by the wireless communication device to transmit the control information over a data-less uplink subframe and then use the determined MCS' to demultiplex and decode the received control information.

Figure 3:
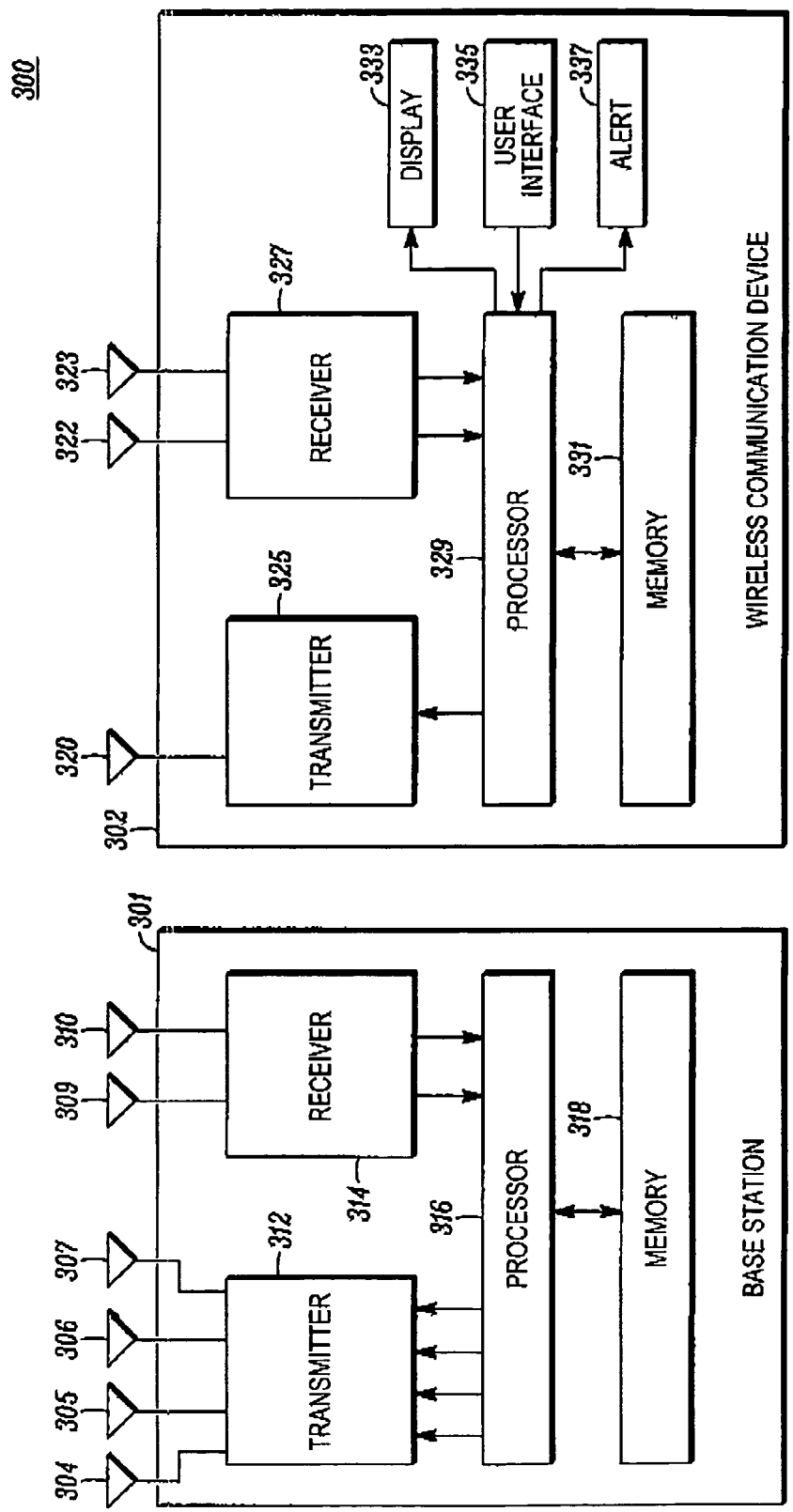
FIG. 3 is an electrical block diagram of a system for communicating control information over a data channel in the absence of user data, in accordance with an exemplary embodiment of the present invention.

Embodiments of the present invention can be more readily understood with reference to FIGS. 3-7, in which like reference numerals designate like items. FIG. 3 is an electrical block diagram of a system 300 for communicating control information over a data channel in the absence of user data, in accordance with an exemplary embodiment of the present invention. The exemplary system 100 includes at least one base station 301 and at least one wireless communication device 302. Typically, the system 300 would include multiple base stations 301 providing wireless communication service to multiple wireless communication devices 302 over a wide coverage area, such as one or more cells or cell sectors in a cellular-type communication system. However, for purposes of simplicity in connection with describing the various features of the present invention, FIG. 1 depicts only one base station 301 and one wireless communication device 302.

Each base station 301 includes, inter alia, one or more transmit antennas 304-307 (four shown for illustration purposes), one or more receive antennas 309, 310 (two shown for illustration purposes), one or more transmitters 312 (one shown for illustration purposes), one or more receivers 314 (one shown for illustration purposes), one or more processors 316 (one shown for illustration purposes), and memory 318. Although illustrated separately, the transmitter 312 and the receiver 314 may be integrated into one or more transceivers as is well understood in the art. By including multiple transmit antennas 304-307 and other appropriate hardware and software as would be understood by those of ordinary skill in the art, the base station 301 may support use of a multiple input and multiple output (MIMO) antenna system for downlink (base station-to-wireless communication device) communications. The MIMO system facilitates simultaneous transmission of downlink data streams from multiple transmit antennas 304-307 depending upon a channel rank, for example as indicated by the wireless communication device 302 or as preferred by the base station 301. A rank supplied by the wireless communication device 302 assists or enables the base station 301 to determine an appropriate multiple antenna configuration (e.g., transmit diversity, open loop spatial multiplexing, closed loop spatial multiplexing, etc.) for a downlink transmission in view of the current downlink channel conditions.

The processor 316, which is operably coupled to the transmitter 312, the receiver 314, and the memory 318, can be one or more of a microprocessor, a microcontroller, a digital signal processor (DSP), a state machine, logic circuitry, any combination thereof, or any other device or combination of devices that processes information based on operational or programming instructions stored in the memory 318. One of ordinary skill in the art will appreciate that the processor 316 can be implemented using multiple processing devices as may be required to handle the processing requirements of the present invention and the various other functions of the base station 301. One of ordinary skill in the art will further recognize that when the processor 316 has one or more of its functions performed by a state machine or logic circuitry, the memory containing the corresponding operational instructions can be embedded within the state machine or logic circuitry as opposed to being external to the processor 316.

The memory 318, which may be a separate element as depicted in FIG. 3 or integrated into the processor 316, can include random access memory (RAM), read-only memory (ROM), FLASH memory, electrically erasable programmable read-only memory (EEPROM), removable memory, a hard disk, and/or various other forms of memory as are well known in the art. The memory 318 can include various components, such as, for example, one or more program memory components for storing programming instructions executable by the processor 316, one or more address memory components for storing an identification code for the base station 301, as well as for storing addresses for wireless communication devices currently in communication with the base station 301, and various data storage components. The program memory component of the memory 318 may include a protocol stack for controlling the transfer of information generated by the processor 316 over the data and/or control channels of the system 300. It will be appreciated by one of ordinary skill in the art that the various memory components can each be a group of separately located memory areas in the overall or aggregate memory 318 and that the memory 318 may include one or more individual memory elements.

In one embodiment, the base station transmitter 312, receiver 314, and processor 316 are designed to implement and support a wideband wireless protocol, such as the Universal Mobile Telecommunications System (UMTS), the E-UTRA protocol, the 3GPP Long Term Evolution protocol, or a proprietary protocol, operating to communicate digital information, such as user data (which may include voice, text, video, and/or graphical data) and/or control information, between the base station 301 and the wireless communication device 302 over control and data channels. In an E-UTRA system, an uplink data channel may be a PUSCH, an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH. The encoding of control information for transmission over a PUSCH, another uplink data channel, or a mobile-to-mobile data channel in the absence of user data is detailed below.

Each wireless communication device 302 includes, inter alia, one or more transmit antennas 320 (one shown for illustrative purposes), one or more receive antennas 322, 323 (two shown for illustrative purposes), one or more transmitters 325 (one shown for illustrative purposes), one or more receivers 327 (one shown for illustrative purposes), a processor 329, memory 331, an optional display 333, an optional user interface 335, and an optional alerting mechanism 337. Although illustrated separately, the transmitter 325 and the receiver 327 may be integrated into one or more transceivers as is well understood in the art. By including multiple receive antennas 322, 323 and other appropriate hardware and software as would be understood by those of ordinary skill in the art, the wireless communication device 302 may facilitate use of a MIMO antenna system for downlink communications.

The wireless communication device transmitter 325, receiver 327, and processor 329 are designed to implement and support a wideband wireless protocol, such as the UMTS protocol, the E-UTRA protocol, the 3GPP Long Term Evolution (LTE) protocol or a proprietary protocol, operating to communicate digital information, such as user data (which may include voice, text, video, and/or graphical data) and/or control information, between the wireless communication device 302 and the base station 301 over control and data channels. In an E-UTRA system, an uplink data channel may be a PUSCH and a downlink control channel may be a PDCCH. Control information may be communicated over the PUSCH and/or the PDCCH. The encoding of control information for transmission over a PUSCH, another uplink data channel, or a mobile-to-mobile data channel in the absence of user data is detailed below.

The processor 329 is operably coupled to the transmitter 325, the receiver 327, the memory 331, the optional display 333, the optional user interface 335, and the optional alerting mechanism 337. The processor 329 utilizes conventional signal-processing techniques for processing communication signals received by the receiver 327 and for processing data and control information for transmission via the transmitter 325. In particular, with respect to processing control information in accordance with embodiments of the present invention, the processor 329 includes logical channel coding and multiplexing blocks as discussed in more detail below with respect to FIGS. 4 and 5. The processor 329 can be one or more of a microprocessor, a microcontroller, a DSP, a state machine, logic circuitry, or any other device or combination of devices that processes information based on operational or programming instructions stored in the memory 331. One of ordinary skill in the art will appreciate that the processor 329 can be implemented using multiple processors as may be required to handle the processing requirements of the present invention and the various other included functions of the wireless communication device 302. One of ordinary skill in the art will further recognize that when the processor 329 has one or more of its functions performed by a state machine or logic circuitry, the memory containing the corresponding operational instructions can be embedded within the state machine or logic circuitry as opposed to being external to the processor 329.

The memory 331, which may be a separate element as depicted in FIG. 3 or integrated into the processor 329, can include RAM, ROM, FLASH memory, EEPROM, removable memory (e.g., a subscriber identity module (SIM) card or any other form of removable memory), and/or various other forms of memory as are well known in the art. The memory 331 can include various components, such as, for example, one or more program memory components for storing programming instructions executable by the processor 329 and for storing one or more address memory components for storing addresses and/or electronic serial numbers for the wireless communication device 302. The program memory component of the memory 331 may include a protocol stack for controlling the transfer of information generated by the processor 329 over the data and/or control channels of the system 300. It will be appreciated by one of ordinary skill in the art that the various memory components can each be a group of separately located memory areas in the overall or aggregate memory 331 and that the memory 331 may include one or more individual memory elements.

The display 333, the user interface 335, and the alerting mechanism 337 are all well-known elements of wireless communication devices. For example, the display 333 may be a liquid crystal display (LCD) or a light emitting diode (LED) display and associated driver circuitry, or utilize any other known or future-developed display technology. The user interface 335 may be a key pad, a keyboard, a touch pad, a touch screen, or any combination thereof, or may be voice-activated or utilize any other known or future-developed user interface technology. The alerting mechanism 337 may include an audio speaker or transducer, a tactile alert, and/or one or more LEDs or other visual alerting components, and associated driver circuitry, to alert a user of the wireless communication device 302. The display 333, the user interface 335, and the alerting mechanism 337 operate under the control of the processor 329.

The wireless communication device 302 may be implemented as a mobile telephone, a smart phone, a text messaging device, a handheld computer, a wireless communication card, a personal digital assistant (PDA), a notebook or laptop computer, a consumer premises equipment (CPE), or any other communication device that has been modified or fabricated to include the functionality of the present invention. A smart phone is a mobile telephone that has additional application processing capabilities. For example, in one embodiment, a smart phone is a combination of 1) a pocket personal computer (PC), handheld PC, palm top PC, or PDA, and 2) a mobile telephone. Exemplary smart phones are the iPHONE™ available from Apple, Inc. of Cupertino, Calif. and the MOTOROLA Q™ available from Motorola, Inc. of Schaumburg, Ill. A wireless communication card, in one embodiment, resides or is insertable within a PC or a laptop computer. The term "wireless communication device," as used herein and the appended claims, is intended to broadly cover many different types of devices that can receive and/or transmit signals and that can operate in a wireless communication system. For example, and not by way of limitation, a wireless communication device can include any one or a combination of the following: a cellular telephone, a mobile phone, a smart phone, a two-way radio, a two-way pager, a wireless messaging device, a laptop/computer, an automotive gateway, a residential gateway, a personal computer, a server, a PDA, CPE, a router, a cordless telephone, a wireless email device, a portable gaming device including a built-in wireless modem, and the like.

Figure 4:
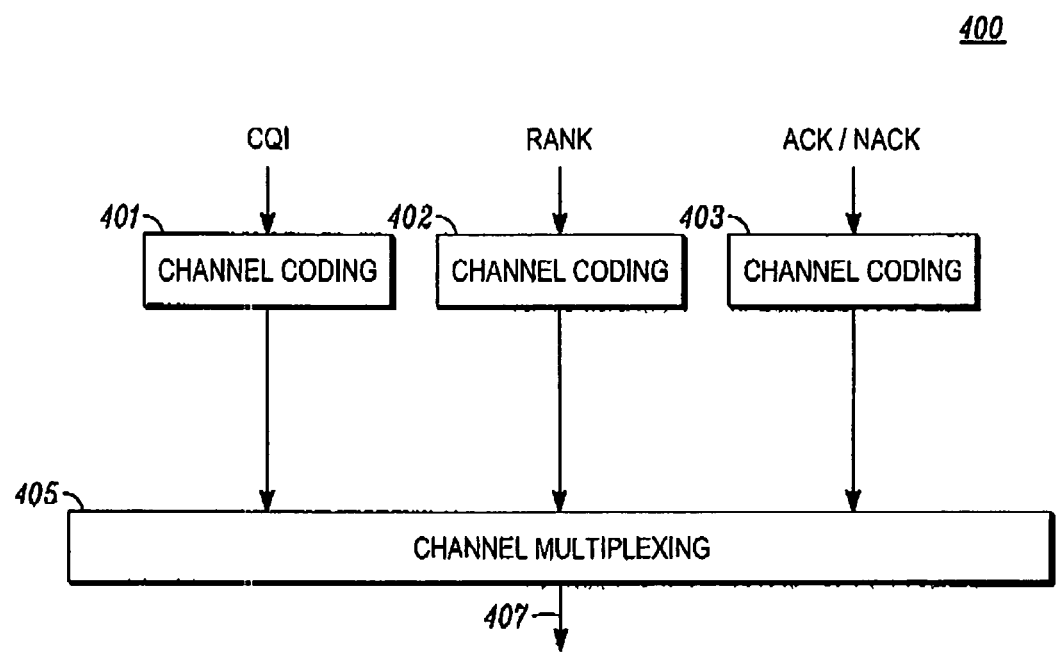
FIG. 4 is a logical block diagram for channel coding and multiplexing functions performed by a processor in a wireless communication device to generate a subframe for transmission of control information over a data channel in the absence of user data, in accordance with an exemplary embodiment of the present invention.

As noted above and illustrated in an exemplary manner in FIG. 4, the wireless communication device processor 329 includes a logical channel coding and multiplexing section 400 for implementing channel coding and multiplexing of control information destined for transmission over a data channel, such as a PUSCH (e.g., when the wireless system 300 is an E-UTRA system). The exemplary channel coding and multiplexing section 400 includes a first channel coding block 401 for encoding control information of a first type (e.g., CQI), a second channel coding block 402 for encoding channel information of a second type (e.g., MIMO rank information), and a third channel coding block 403 for encoding control information of a third type (e.g., HARQ-ACK/NACK). The channel coding and multiplexing section 400 may include additional coding blocks for encoding various other types of control information and/or reference symbols used by the base station 301 for demodulation and uplink channel quality determination. These additional coding blocks have been excluded from FIG. 4 for purposes of clarity and simplicity. The channel coding and multiplexing section 400 also includes a channel multiplexing block 405 that multiplexes the encoded control information generated by the channel coding blocks 401-403 according to the present invention into a subframe 407, which is supplied to the transmitter 325 for transmission over the uplink data channel.

Figure 2:
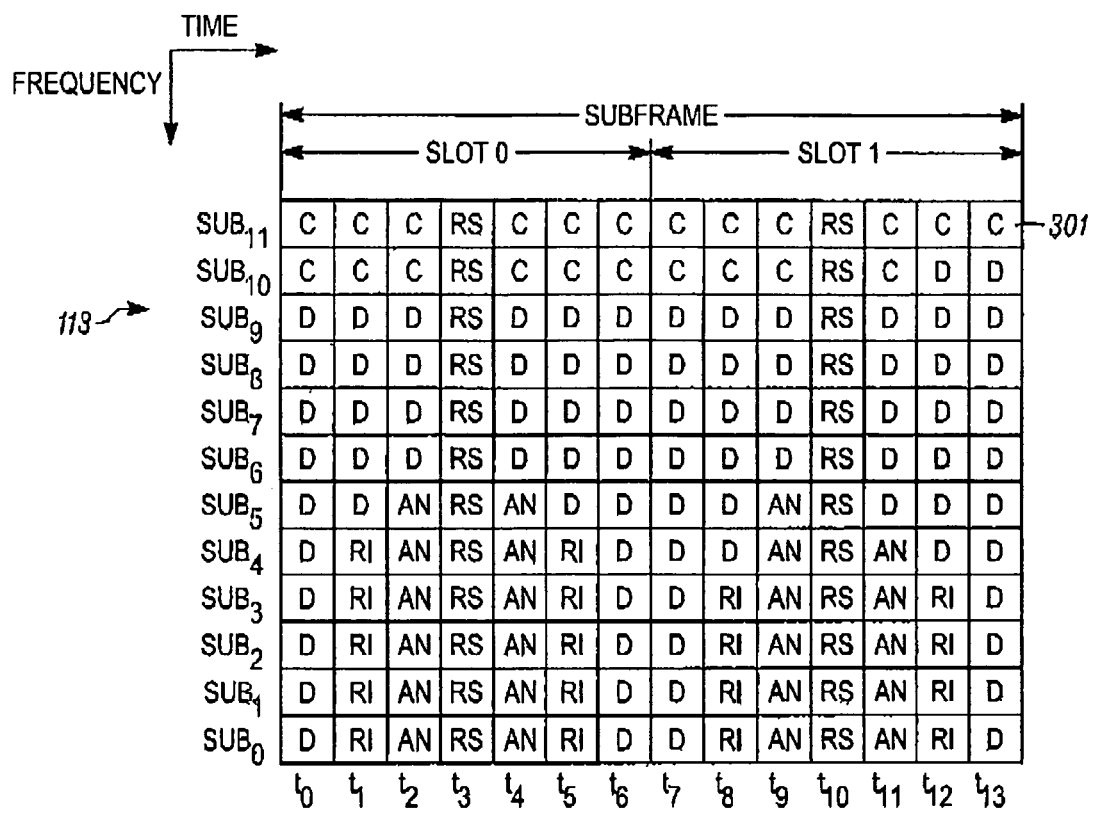
FIG. 2 is an exemplary SC-FDMA subframe for transmission of control information and data over a PUSCH in accordance with the E-UTRA standard.

The channel coding and multiplexing section 400 depicted in FIG. 4 is a logical section in that the coding and multiplexing illustrated therein is performed by the processor 329 responsive to programming instructions stored in memory 331. Additionally, the logical section 400 illustrated in FIG. 4 represents the logical blocks operating in the processor 329 during the period of time when the processor 329 is generating a subframe 407 for transmission of control information over a data channel in the absence of user data. When user data is to be sent and the system 300 is an E-UTRA system, subframe generation is performed by the processor 329 as described above with respect to FIGS. 1 and 2.

Referring now to FIGS. 3-6, operation of the wireless communication device 302 in the exemplary wireless system 300 occurs substantially as follows in accordance with the present invention. Prior to the scheduling of any control information to be sent over a data channel, a reference block size for transmission of a first type of control information (e.g., channel quality information, such as CQI and/or a pre-coding matrix index (PMI)) is stored (601) in the memory 331 of the wireless communication device 302. In one embodiment in which the wireless system 300 is an E-UTRA system utilizing single-carrier frequency division multiple access (SC-FDMA) for uplink communications, the reference block size is a quantity of bits determined based on a set of assumptions, including a predetermined quantity of information bits (which may include error correction bits) used for transmitting CQI. A reference coding rate may be determined based on the reference block size, a predetermined modulation for transmitting CQI, use of a predetermined quantity of subcarriers per unit time (e.g., 1 ms) over which the control information will be spread, and a MIMO rank indicator value. For example, one reference block size may be stored for a MIMO rank indicator value of one and another reference block size may be stored for a MIMO rank indicator value greater than one. Alternatively, where the wireless system 300 is not an E-UTRA system employing SC-FDMA for uplink transmissions, the reference block size may be based on a predetermined quantity of information bits used for transmitting the first type of control information (e.g., CQI or another reference type of control information). The reference coding rate may then be determined based on the reference block size, as well as the modulation used for transmitting such type of control information and the quantity of carriers or subcarriers per unit time used for uplink transmission.

Some time after the reference block size has been stored in wireless communication device memory 331, the wireless device receiver 327 receives (603) a scheduling message from the base station 301 or another transmission scheduling entity. The scheduling message includes a resource allocation identifying a set of transmission resources for transmitting control information over a data channel and may optionally include other information, such as a request for channel quality information and identification of a modulation to be used for transmission of the control information over the data channel. However, in contrast to scheduling grant messages in E-UTRA systems that schedule transmission of both control information and user data over uplink data channels, the received control information scheduling message may exclude any instructions or reference based upon which the wireless device processor 329 may determine which transmission resources of the resource allocation are to be used for transmitting each type of control information and, therefore, how the control information is to be encoded and multiplexed into the allocated transmission resources. In other words, the scheduling message schedules transmission of control information over an uplink data channel in the absence of user data and, in one embodiment, excludes any modulation and coding scheme (MCS) based upon which the wireless device processor 329 can determine an MCS for each type of control information.

For example, in an E-UTRA system, the scheduling message may be a scheduling grant message (or downlink control information (DCI)) that includes a resource block allocation identifying a set of transmission resources which have been allocated for transmitting control information (e.g., one resource block containing 12 contiguous subcarriers for 1 ms, with each subcarrier synchronously time-divided into 14 equal length resource elements), a modulation identifier (e.g., identifying QPSK as the modulation for transmitting CQI, and optionally for transmitting rank information and/or ACK/NACK), and a CQI bit requesting aperiodic transmission of CQI, but that excludes any MCS for guiding the processor 329 in determining how to encode and multiplex the control information into the allocated set of transmission resources.

The receiver 327 forwards a baseband version of the received scheduling message to the processor 329 for processing of the scheduling message contents. Through such processing, the processor 329 may determine the timing of the control information transmission, the set of transmission resources which have been allocated for the control information, the modulation to be used, and whether CQI information has been requested.

In anticipation of the scheduled transmission of control information over the data channel, the wireless device processor 329 proceeds to determine which control information is to be included in the transmission and how the allocated set of transmission resources (e.g., subframe resource elements) are to be encoded with the control information and multiplexed together. However, as noted above and in contrast to the scheduled transmission of control information together with user data over an uplink data channel, the determination may be made without the benefit of an MCS provided by the base station 301. Therefore, in accordance with one embodiment of the present invention, the wireless device processor 329 determines (605) whether control information of a second type is to be sent over the data channel with or without the control information of the first type. In an E-UTRA system employing a MIMO antenna system for downlink transmissions, the second type of control information may comprise a rank indicator (RI) for the MIMO antenna system. Alternatively, where no rank indication is to be provided, the second type of control information may be an ACK/NACK or any other type of control information.

In the event that control information of the second type is to be sent, the wireless device processor 329 determines (607) a quantity of the allocated transmission resources for use in transmitting the second type of control information. Such determination is based on the reference block size stored in the wireless device memory 331 and a predetermined modulation (e.g., QPSK) for transmitting control information of the first type (e.g., CQI). In an E-UTRA system embodiment, the quantity of transmission resources used for the second type of control information when the first type of control information is CQI may be determined per the following equation (Equation 2):

$$Q = \left\lceil \frac{O_{max}}{Q_m R_{CQI}} \cdot 10^{-\frac{\Delta_{offset}^{PUSCH}}{10}} \right\rceil$$

where $O_{max}$ is the number of HARQ-ACK or RI bits and $R_{CQI}$ is a code rate given by the following equation (Equation 3):

$$R_{CQI} = \frac{O_{CQI}}{Q_m \cdot M_{sc}^{PUSCH} \cdot N_{symb}^{PUSCH}}$$

where $M_{sc}^{PUSCH}$ is the scheduled bandwidth for uplink transmission expressed as a number of subcarriers as in 3GPP Technical Specification (TS) 36.211 and $O_{CQI}$ is the number of CQI bits including error correction (e.g., cyclic redundancy check (CRC)) bits assuming MIMO rank greater than one and $\Delta_{offset}^{PUSCH}$ is a performance difference between a given control channel and a data channel (e.g., PUSCH) in decibels (dB). Equation 3 effectively functions as a reference CQI coding rate based upon which the coding rate for each type of control information may be determined.

Substituting $R_{CQI}$ of Equation 3 and using O instead of $O_{max}$ as the number of HARQ-ACK or RI bits, the equation for the number of transmission resources (e.g., resource elements) becomes the following equation (Equation 4):

$$Q = \left\lceil \frac{O \cdot M_{sc}^{PUSCH} \cdot N_{symb}^{PUSCH}}{10^{-\frac{\Delta_{offset}^{PUSCH}}{10}} \cdot O_{CQI}} \right\rceil$$

where O is the number of ACK/NACK bits or rank indicator bits, $O_{CQI}$ is the number of CQI bits including CRC bits, $M_{sc}^{PUSCH}$ is the scheduled bandwidth for PUSCH transmission in the current subframe expressed as a number of subcarriers as in 3GPP TS36.211, and the function ($\lceil \cdot \rceil$) rounds the quantity of transmission resources to an integer value towards positive infinity.

To further limit the quantity of transmission resources that can be used in an E-UTRA system embodiment for transmitting control information of the second type, or collectively of all types of control information other than the first type, to a predetermined maximum quantity of SC-FDMA symbols (e.g., four SC-FDMA symbols), a minimization function may be applied to the right-hand side of Equation 4, resulting in the quantity of transmission resources available for the second type of control information being determinable from the following equation (Equation 5):

$$Q = \min\left( \left\lceil \frac{O \cdot M_{sc}^{PUSCH} \cdot N_{symb}^{PUSCH}}{10^{-\frac{\Delta_{offset}^{PUSCH}}{10}} \cdot O_{CQI-ref}} \right\rceil, 4 \cdot M_{sc}^{PUSCH} \right)$$

where O is the quantity of bits of control information of the second type (e.g., RI or HARQ-ACK/NACK), $O_{CQI-ref}$ is a reference quantity of CQI bits including CRC bits assuming MIMO rank is one (e.g., a reference block size), $M_{sc}^{PUSCH}$ is the scheduled bandwidth for a PUSCH transmission in the current subframe expressed as a quantity of subcarriers in 3GPP TS36.211, and the function ($\lceil \cdot \rceil$) rounds the quantity of transmission resources to an integer value towards positive infinity. Equations 2-5 exclude the transmission resources of the subframe which are used to transmit reference or pilot symbols for use by the base station 301 to facilitate demodulation of received data or control information symbols and/or determination of uplink channel quality.

With respect to the variables identified in Equation 5, the base station 301 sends $\Delta_{offset}^{PUSCH}$ values to the wireless communication device 302, in one embodiment, as part of radio resource control (RRC) messages or higher layer signaling in accordance with the E-UTRA protocol. $M_{sc}^{PUSCH}$ is the scheduled or predetermined bandwidth for PUSCH transmission in the current subframe expressed as a number of subcarriers and is typically signaled by the base station 301 as part of the scheduling message or other downlink control signaling. $N_{symb}^{PUSCH}$ is the quantity of SC-FDMA symbols in the current subframe excluding any symbols reserved for uplink reference (or pilot) symbols and/or sounding reference symbols. Therefore, the quantity $\{M_{sc}^{PUSCH} \cdot N_{symb}^{PUSCH}\}$ represents the resource allocation or set of transmission resources (e.g., resource elements) allocated by the base station 301 for an uplink transmission of control information. Finally, $O_{CQI\text{-}ref}$ is a reference CQI payload size, which is similar to determining a reference CQI MCS. O is the actual quantity of bits of control information of the second type (e.g., RI bits or HARQ-ACK/NACK bits) to be transmitted by the wireless communication device 301 on the uplink data (e.g., PUSCH) channel.

When the second type of control information is a MIMO rank indicator, the quantity of RI bits (O) is known at both the base station 301 and the wireless communication device 302 and is stored in memory 318, 331. While both the base station 301 and the wireless communication device 302 know the quantity of RI bits to be transmitted by the wireless communication device 301, the actual rank indicator value (1 or 2 in the case of a 1-bit rank value, or 1, 2, 3, or 4 in case of a 2-bit rank value) is determined by the wireless communication device processor 329 based on receipt and processing of downlink reference (or pilot) symbols and a reporting mode in accordance with the E-UTRA specification. Along with the rank value, the wireless device processor 329 may also compute one CQI value when rank is one and two CQI values when rank is greater than one, which may be fed back to the base station 301. Thus, for example, if the CQI payload size is N bits when rank equals one, then the CQI payload size may be 2N bits when rank is greater than one. Additionally, the E-UTRA standard allows some CQI payload sizes (e.g., greater than 13 bits) to be protected with a CRC code for error detection.

When the second type of control information is an HARQ-ACK/NACK, the quantity of ACK/NACK bits (O) is known at the base station 301, but not the wireless communication device 302. According to the E-UTRA standard, when operating in frequency division duplex (FDD) mode, in a given subframe n, the wireless communication device 302 is expected to send an ACK or NACK for downlink packets received by the wireless communication device 302 in subframe n−4 (i.e., 4 ms earlier). Thus, the wireless communication device 302 decodes the downlink control information in subframe n−4 and, if the wireless communication device 302 detects one downlink packet in subframe n−4, it knows that it has to send one HARQ-ACK bit in subframe n (i.e., 4 ms later). Alternatively, if the wireless communication device 302 detects two downlink packets in subframe n−4, it knows it has to send two HARQ-ACK bits in subframe n.

After determining a quantity of the set of allocated transmission resources to be used for transmitting control information of the second type, the wireless device processor 329 determines (609) a quantity of the allocated set of transmission resources to be used for transmitting control information of the first type (e.g., CQI) based on the reference block size and the quantity of transmission resources assigned to transmission of the second type of control information. Where no other control information is to be transmitted, the quantity of transmission resources determined for the first type of control information is the total allocated transmission resources less the transmission resources assigned for transmission of the second type of control information.

Once the transmission resources have been assigned for the first and second types of control information, the wireless device processor encodes (611) the control information into their associated or assigned transmission resources (e.g., resource elements) and multiplexes (613) reference or pilot symbols (when included), the encoded first type of control information, and the encoded second type of control information into a subframe 407 of the uplink data channel. In order to accomplish the encoding and multiplexing, the wireless device processor 329 utilizes its logical channel coding and multiplexing section 400 as illustrated in FIG. 4. Channel coding block 401 encodes the first type of control information (e.g., CQI) into transmission resources (resource elements) assigned to the first type of control information. Similarly, channel coding block 402 encodes the second type of control information (e.g., RI) into transmission resources (resource elements) assigned to the second type of control information. Where a third type of control information (e.g., HARQ-ACK/NACK) is to be transmitted, channel coding block 403 encodes the third type of control information into transmission resources (resource elements) assigned to the third type of control information as discussed in more detail below. In an alternative embodiment, prior to encoding the control information of the first type (e.g., CQI), the wireless device processor 329 may determine a block size for the first type of control information, which may be different than the reference block size stored in wireless device memory 331, based on the control information of the second type (e.g., rank). For example, the reference block size may be set to N bits assuming a rank equal to one. However, when the value of rank as determined by the wireless device processor 329 is two, then the CQI payload or block size that is transmitted on the uplink may be 2N bits, which is different than the reference block size. Alternatively, when the value of rank as determined by the wireless device processor 329 is one, the CQI payload or block size that is transmitted on the uplink may be N bits, which is the same as the reference block size.

After encoding of the first and second types of control information into their respective transmission resources, the channel multiplexing block 405 multiplexes the transmission resources into the subframe 407 according to a predetermined routine. For example, in one embodiment in which the set of allocated transmission resources is arranged in accordance with SC-FDMA uplink signaling pursuant to the E-UTRA standard, the first type of control information is CQI, and the second type of control information is a rank indicator, the set of allocated transmission resources is divided in time across a group of contiguous subcarriers occupying a predetermined bandwidth (e.g., 180 kHz) and each transmission resource is a resource element occupying a predetermined amount of time on one of the subcarriers. In such a case, the resource elements containing the CQI are multiplexed by the channel multiplexing block 405 into the subframe 407 commencing at a first edge of the predetermined bandwidth (e.g., at the highest frequency edge of the bandwidth) and the resource elements containing the rank indicator are multiplexed by the channel multiplexing block 405 into the subframe 407 commencing at a second, opposite edge of the predetermined bandwidth (e.g., at the lowest frequency edge of the bandwidth). The encoded bits for a particular type of control information are multiplexed into each unoccupied resource element of one subcarrier before progressing to the next subcarrier in either an increasing frequency direction (e.g., in the case of rank information) or decreasing frequency direction (e.g., in the case of CQI). By multiplexing the resource elements into the subframe in this manner, each type of control information is spread across one or more SC-FDMA symbols forming the subframe 407. In one embodiment, uplink reference symbols are multiplexed into the subframe 407 prior to multiplexing the other types of control information such that the reference symbols occupy the fourth and eleventh symbols of the subframe 407, rendering the resource elements associated with such symbols unavailable for insertion of encoded CQI, RI, or other types of control information. In another embodiment, the encoded rank information is multiplexed into the resource elements of the subframe 407 after the reference symbols have been added to the subframe 407, but before the encoded CQI is multiplexed into the subframe 407. In an alternative embodiment, the encoded CQI may be multiplexed into the resource elements of the subframe 407 before the encoded rank information.

In the event that rank information or another type of similarly-situated control information is not to be sent in the subframe 407, the wireless device processor 329 determines (615) a quantity of transmission resources for transmitting the first type of control information (e.g., channel-coded CQI) based on the reference block size. In this case, if no other control information is going to be sent as determined or known by the wireless device processor 329 at or prior to the time at which the processor 329 determines the quantity of transmission resources for transmitting control information of the first type, the wireless device processor determines that the first type of control information (e.g., CQI and its associated error correction bits) is to be assigned to all the transmission resources (resource elements) which are not being used for transmitting reference symbols (when included). After such determination has been made, the wireless device processor 329 employs channel coding block 401 of the channel coding and multiplexing section 400 to encode (617) the first type of control information (e.g., channel-coded CQI) into the associated transmission resources. The channel multiplexing block 405 then multiplexes (619) the reference symbols (when included) and encoded control information into the subframe 407 of the data channel. In one embodiment, the resource elements containing the reference symbols are multiplexed into the subframe 407 prior to multiplexing the resource elements containing the channel-coded CQI, such that the reference symbols occupy the fourth and eleventh symbols of the subframe 407, rendering the resource elements associated with such symbols unavailable for insertion of encoded CQI. The resource elements containing the channel-coded CQI are then multiplexed into unoccupied resource elements of the subframe 407 commencing at a first edge of the predetermined bandwidth (e.g., at the highest or lowest frequency edge of the bandwidth). In one embodiment, the encoded bits for the first type of control information are multiplexed into each unoccupied resource element of one subcarrier before progressing to the next subcarrier in either an increasing frequency direction (e.g., when multiplexing is commenced at the lowest frequency edge of the bandwidth) or decreasing frequency direction (e.g., when multiplexing is commenced at the highest frequency edge of the bandwidth). By multiplexing the resource elements into the subframe in this manner, the first type of control information is spread across potentially all of the SC-FDMA symbols forming the subframe 407 except for the reference symbols.

In one embodiment, after either the first and second types of control information (e.g., channel-coded rank information and channel-coded CQI) or just the first type of control information (e.g., channel-coded CQI in the absence of rank information) has been encoded and multiplexed into the subframe 407, the wireless device processor 329 determines (621) whether a third type of control information is to be sent over the data channel. For example, the wireless device processor 329 may determine whether any HARQ-ACKs or NACKs need to be sent in response to previously received user data. If a third type of control information need not be sent, the wireless device processor 329 exits the logic flow and provides the subframe 407 to the transmitter 325 for modulation and transmission. If, on the other hand, control information of a third type (and, in particular, one or more HARQ-ACKs or NACKs) needs to be sent, the wireless device processor 329 determines (623) a quantity of the allocated transmission resources for the third type of control information based on the reference block size. For an SC-FDMA uplink data channel implementing the E-UTRA standard, the determination of the quantity of transmission resources (resource elements) for the HARQ-ACKs/NACKs may be determined from Equation 5 above when the symbols permitted to be used for the second and third types of control information (e.g., rank and ACK/NACK) are limited to a predetermined maximum quantity of SC-FDMA symbols (e.g., four symbols). Where no such limitation on rank and ACK/NACK symbols is desired, Equation 4 may be used to determine the quantity of resource elements for use in transmitting the third type of control information.

After the quantity of transmission resources has been determined for the third type of control information, the wireless device processor 329 employs its logical channel coding and multiplexing section 400 to encode and multiplex the third type of control information into the subframe 407 of the data channel (e.g., PUSCH). For example, channel coding block 403 encodes (625) the ACK/NACK bits into the resource elements determined pursuant to Equation 4 or Equation 5 and the channel multiplexing block multiplexes (627) the resource elements containing the encoded ACK/NACK bits into the subframe 407. In one embodiment, the resource elements containing the encoded ACK/NACK bits are multiplexed into the subframe 407 after the resource elements containing the encoded rank and CQI have been multiplexed into the subframe 407. In such a case, multiplexing the resource elements containing the third type of control information (ACK/NACK) into the subframe 407 would necessarily overwrite or purge some of the resource elements already contained in the subframe 407. According to one embodiment of the present invention, the channel multiplexing block 405 multiplexes the ACK/NACK resource elements into the subframe 407 such that they overwrite only CQI resource elements. The overwritten resource elements may be recovered at the base station 301 through execution of the error correction routine used to produce the channel-coded CQI.

In order to restrict which resource elements may be overwritten, the programming instructions implementing the channel multiplexing block 405 may provide an order for arranging the resource elements in the subframe 407. For example, in one embodiment in which the subframe 407 consists of a set of SC-FDMA symbols, the channel multiplexing block 405 positions the reference symbols (when included) in the subframe 407 as the fourth and eleventh SC-FDMA symbols. The channel multiplexing block 405 then inserts the rank resource elements (when included) into the second, sixth, ninth and thirteenth SC-FDMA symbols commencing at the lowest frequency edge of the allocated bandwidth and moving to toward the highest frequency edge of the bandwidth until all of the rank resource elements have been inserted. After the rank resource elements have been inserted, the channel multiplexing block 405 inserts the CQI resource elements into any incomplete SC-FDMA symbols commencing at the highest frequency edge of the allocated bandwidth and moving to toward the lowest frequency edge of the bandwidth until all the symbols are complete. If ACK/NACK resource elements are to be included, the channel multiplexing block 405 inserts the ACK/NACK resource elements into the third, fifth, tenth, and twelfth SC-FDMA symbols (e.g., those symbols that are adjacent or closest to the reference symbols) commencing at the lowest frequency edge of the allocated bandwidth and moving to toward the highest frequency edge of the bandwidth until all the ACK/NACK resource elements have been inserted. However, since CQI resource elements had already been written into the third, fifth, tenth, and twelfth SC-FDMA symbols, insertion of the ACK/NACK resource elements overwrites or purges some of the CQI resource elements in the third, fifth, tenth, and twelfth SC-FDMA symbols. In this example, the quantity of resource elements for each of the rank information and the ACK/NACK information are determined by Equation 5, such that the quantity of SC-FDMA symbols which may be used to transmit rank and ACK/NACK control information is less than or equal to a predetermined maximum quantity of SC-FDMA symbols (e.g., two, four, or such other predetermined quantity of symbols), where each SC-FDMA symbol includes a common time segment on each subcarrier allocated by the base station 301 in the resource allocation.

Figure 5:
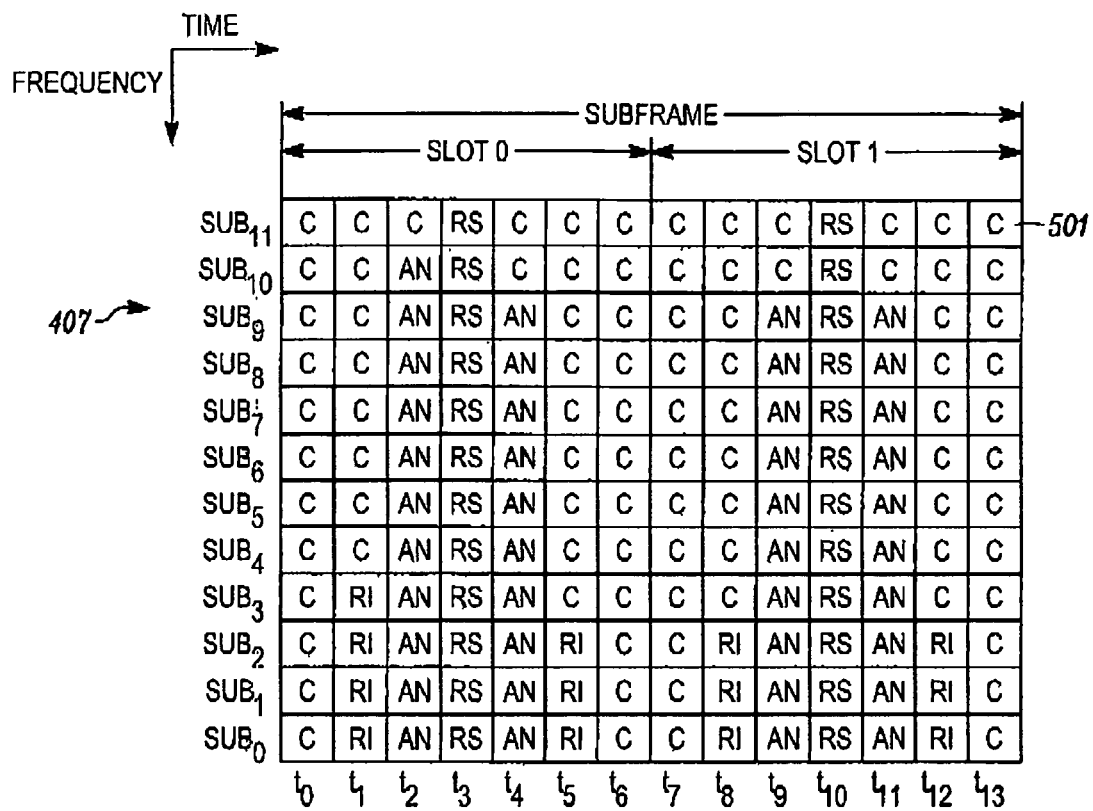
FIG. 5 is an exemplary subframe for transmission of control information over a data channel in the absence of data, in accordance with an exemplary embodiment of the present invention.

FIG. 5 illustrates an exemplary subframe 407 produced by the channel coding and multiplexing section 400 of the wireless device processor 329 and containing encoded control information in the absence of user data, in accordance with the present invention. The subframe 407 illustrated in FIG. 5 includes an allocation of fourteen SC-FDMA symbols. Each SC-FDMA symbol includes resource elements 501 divided in time across a set of twelve contiguous subcarriers ($sub_0$-$sub_{11}$). Thus, each SC-FDMA symbol corresponds to the resource elements 501 that are spread across all twelve subcarriers during a predetermined segment of time ($t_0$-$t_{13}$), where each resource element 501 for a particular SC-FDMA symbol occupies the same time segment. The example subframe 407 depicted in FIG. 5 corresponds to a subframe generated to transmit a one bit rank indicator, a two bit HARQ-ACK, CQI, and two reference symbols. Utilizing Equation 5 with QPSK modulation scheduled for transmission of all the control information yields thirteen resource elements for rank information, forty-one resource elements for HARQ-ACK/NACK information, twenty-four resource elements for the reference symbols (known a priori and not determined by Equation 5), and one-hundred thirty one resource elements for channel coded CQI (of these one-hundred thirty-one resource elements for CQI, forty-one resource elements are overwritten by the ACK/NACK information). In the exemplary subframe 407 of FIG. 5, "C" represents channel-coded CQI bits, "RI" represents channel-coded rank indicator bits, "AN" represents channel-coded HARQ-ACK/NACK bits, and "RS" represents reference symbol bits.

To multiplex the control information resource elements 501 into the subframe 407 according to one embodiment of the present invention, the resource elements for the reference symbols are multiplexed across all twelve subcarriers for time segments $t_3$ and $t_{10}$, which correspond to the fourth and eleventh SC-FDMA symbols. If the subframe 407 is equally divided into two time slots (Slot 0 and Slot 1) as illustrated in FIG. 5, each reference symbol may be multiplexed into the center SC-FDMA symbol of each time slot. After the reference symbols are inserted into the subframe 407, the thirteen resource elements containing the rank indicator are inserted into predetermined symbols of the subframe 407 commencing at one edge of the allocated bandwidth of twelve subcarriers. For example, according to the illustrated exemplary embodiment, the resource elements containing rank information are inserted into the second, sixth, ninth, and thirteenth time segments ($t_0$, $t_5$, $t_8$, and $t_{12}$) commencing at the lowest frequency edge ($sub_0$) of the bandwidth and proceeding to each next higher frequency subcarrier until all thirteen rank resource elements have been multiplexed into the subframe 407. The second, sixth, ninth, and thirteenth time segments of the subframe 407 correspond to the second, sixth, ninth, and thirteenth SC-FDMA symbols of the subframe 407. In the exemplary subframe 407 of FIG. 5, the rank information occupies the resource elements on subcarriers $sub_0$ through $sub_3$ in time segment $t_1$, the resource elements on subcarriers $sub_0$ through $sub_2$ in time segment $t_5$, the resource elements on subcarriers $sub_0$ through $sub_2$ in time segment $t_8$, and the resource elements on subcarriers $sub_0$ through $sub_2$ in time segment $t_{12}$.

After the resource elements 501 for the rank information have been multiplexed into the subframe 407, the one-hundred thirty-one resource elements containing the channel-coded CQI are inserted into available symbols of the subframe 407 commencing at the opposite edge of the allocated bandwidth of twelve subcarriers. For example, according to the illustrated exemplary embodiment, the resource elements containing CQI information are inserted into all the time segments (and, accordingly, the corresponding SC-FDMA symbols) except for the time segments containing the reference symbols ($t_3$ and $t_{10}$) commencing at the highest frequency edge ($sub_{11}$) of the bandwidth and proceeding to each next lower frequency subcarrier until all one-hundred thirty-one CQI resource elements have been multiplexed into the subframe 407 without overwriting any rank resource elements. In the exemplary subframe 407 of FIG. 5, the CQI information occupies, at least prior to multiplexing of the ACK/NACK resource elements, the resource elements on subcarriers $sub_0$ through $sub_{11}$ in time segment $t_0$, the resource elements on subcarriers $sub_4$ through $sub_{11}$ in time segment $t_1$, the resource elements on subcarriers $sub_0$ through $sub_{11}$ in time segment $t_2$, the resource elements on subcarriers $sub_0$ through $sub_{11}$ in time segment $t_4$, the resource elements on subcarriers $sub_3$ through $sub_{11}$ in time segment $t_5$, the resource elements on subcarriers $sub_0$ through $sub_{11}$ in time segment $t_6$, the resource elements on subcarriers $sub_0$ through $sub_{11}$ in time segment $t_7$, the resource elements on subcarriers $sub_3$ through $sub_{11}$ in time segment $t_8$, the resource elements on subcarriers $sub_0$ through $sub_{11}$ in time segment $t_9$, the resource elements on subcarriers $sub_0$ through $sub_{11}$ in time segment $t_{11}$, the resource elements on subcarriers $sub_3$ through $sub_{11}$ in time segment $t_{12}$, and the resource elements on subcarriers $sub_0$ through $sub_{11}$ in time segment $t_{13}$.

After the resource elements 501 for the CQI information have been multiplexed into the subframe 407, the forty-one resource elements 501 containing the ACK/NACK information are inserted into symbols of the subframe 407 commencing at the same edge of the allocated bandwidth as was commencement of multiplexing the rank resource elements into the subframe 407. In this case, however, the resource elements for the ACK/NACK information may overwrite or purge any conflicting CQI resource elements, but not any rank or reference symbol resource elements. For example, according to the illustrated exemplary embodiment, the resource elements containing ACK/NACK information are inserted into the third, fifth, tenth, and twelfth time segments ($t_2$, $t_4$, $t_9$, and $t_{11}$) commencing at the lowest frequency edge ($sub_0$) of the bandwidth and proceeding to each next higher frequency subcarrier until all forty-one ACK/NACK resource elements have been multiplexed into the subframe 407. The third, fifth, tenth, and twelfth time segments of the subframe 407 correspond to the third, fifth, tenth, and twelfth SC-FDMA symbols of the subframe 407. In the exemplary subframe 407 of FIG. 5, the ACK/NACK information occupies the resource elements and overwrites the previously multiplexed error-corrected CQI information on subcarriers $sub_0$ through $sub_{10}$ in time segment $t_2$, subcarriers $sub_0$ through $sub_9$ in time segment $t_4$, subcarriers $sub_0$ through $sub_9$ in time segment $t_9$, and subcarriers $sub_0$ through $sub_9$ in time segment $t_{11}$.

Therefore, the exemplary protocol for multiplexing control information resource elements into the subframe 407 may be summarized as follows: reference symbols are multiplexed into the subframe 407, rank information is inserted into one set of SC-FDMA symbols that excludes the reference symbols, CQI information is inserted into another set of SC-FDMA symbols that excludes the reference symbols such that the CQI information does not overwrite the rank information, and ACK/NACK information is inserted into a third set of SC-FDMA symbols that excludes the reference symbols such that the ACK/NACK information does not overwrite the rank information, but may overwrite some of the CQI information. While the exemplary subframe 407 includes 168 resource elements 501 divided into fourteen time periods or segments ($t_0$-$t_{13}$) across twelve contiguous subcarriers ($sub_0$-$sub_{11}$) and corresponding to fourteen SC-FDMA symbols, those of ordinary skill in the art will readily recognize that the subframe may be alternatively configured with any desired quantity of transmission resources divided into any desired quantity of time periods across a predetermined number of contiguous or discontiguous subcarriers to form a desired quantity of transmission symbols. As a result, the above examples discussed with respect to FIGS. 3-5 are illustrative and should not be construed to limit the present invention as defined by the appended claims.

An E-UTRA embodiment of the present invention may be further understood with respect to the following illustrative examples. For purposes of these examples and the use of Equation 5 therewith, it is assumed that the control offset value for A/N is $\Delta_{offset}^{PUSCH}=6$ dB, the control offset value for rank information is $\Delta_{offset}^{PUSCH}=4$ dB, $M_{sc}^{PUSCH}=12$ subcarriers, and $N_{symb}^{PUSCH}=12$ SC-FDMA symbols. Thus, there are a total of 12×12=144 resource elements (REs) that are to be filled with the control information taking into account the resource elements expected to be occupied in the subframe by the SC-FDMA reference symbol(s). It is further assumed that the CQI payload size is 20 bits when MIMO rank (Rank) is equal to one and that the CQI payload size may be 40 bits when Rank is greater than one. Additionally, it is assumed that the CQI is protected with an 8-bit CRC to have a payload of 28 or 48 bits, for Rank=1 and Rank>1, respectively. Further, it is assumed that all the control information use QPSK modulation on the uplink, which would be the case for a data-less PUSCH uplink in an E-UTRA system. With the foregoing assumptions, $O_{CQI-ref}$ represents the quantity of CQI bits including CRC bits assuming Rank=1. Therefore, $O_{CQI-ref}=28$ is used in Equation 5 irrespective of the actual number of CQI bits that are transmitted on the uplink to yield the following equation (Equation 6) for determining the quantities of rank and HARQ-ACK/NACK resource elements:

$$Q = \min\left(\left\lceil \frac{O \cdot 144}{10^{-\frac{\Delta_{offset}^{PUSCH}}{10}} \cdot 28} \right\rceil, 48\right).$$

To further simplify Equation 6, the exponential term $$10^{-\frac{\Delta_{offset}^{PUSCH}}{10}}$$

may be replaced with a linear equivalent constant for numerical stability, such as $$\beta_{offset} = 10^{-\frac{\Delta_{offset}^{PUSCH}}{10}}.$$

The following table (Table 1) indicates the quantity of resource elements (REs) used for MIMO rank, the quantity of resource elements used for HARQ-ACK/NACK, and the actual number of resource elements for CQI as computed using Equation 6 based on the listed quantities of bits used to indicate MIMO rank and HARQ-ACK/NACK. The exemplary subframe 407 of FIG. 5 corresponds to the resource element allocation identified in the second row of Table 1 below.

TABLE 1

| Number of bits for Rank | Number of bits for ACK/NACK | Number of actual CQI + CRC bits fed back on the uplink | Number of REs for Rank | Number of REs for ACK/NACK | Actual Number of REs for CQI |
|---|---|---|---|---|---|
| 1 | 1 | 28 | 13 | 21 | 144 − (13 + 21) = 110 |
| 1 | 2 | 28 | 13 | 41 | 144 − (13 + 41) = 90 |
| 2 | 2 | 48 | 26 | 41 | 144 − (26 + 41) = 77 |
| 2 | 1 | 48 | 26 | 21 | 144 − (26 + 21) = 97 |
| 1 | 0 | 28 | 13 | 0 (NO ACK/NACK multiplexed) | 144 − 13 = 131 |
| 2 | 0 | 48 | 26 | 0 (NO ACK/NACK multiplexed) | 144 − 26 = 118 |

Figure 7:
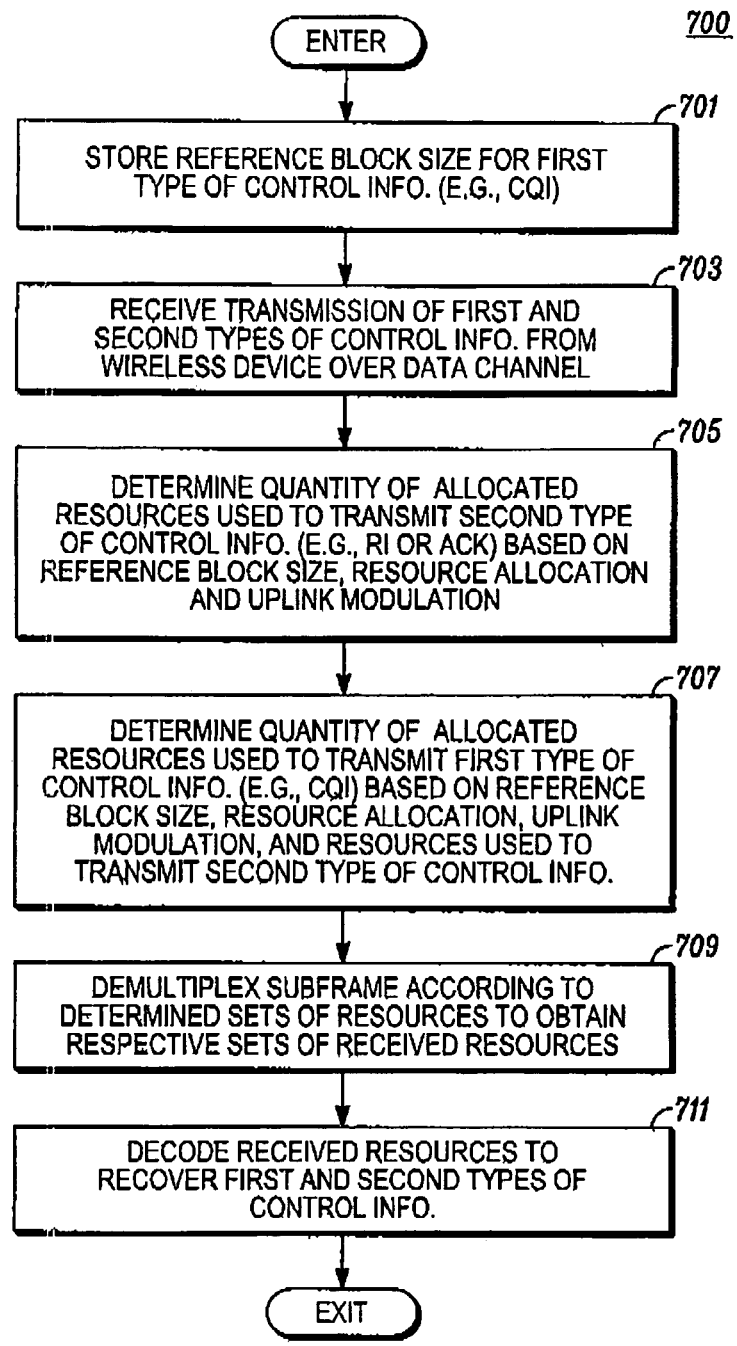
FIG. 7 is a logic flow diagram of steps executed by a base station to process control information transmitted by a wireless communication device on an uplink data channel in the absence of user data, in accordance with an exemplary embodiment of the present invention.

Referring now to FIGS. 3 and 7, operation of the exemplary base station 301 to process a subframe 407 of control information transmitted by the wireless communication device 302 in accordance with one embodiment of the present invention will be described. Prior to receipt of the subframe 407, the reference block size for the first type of control information (e.g., CQI) is stored (701) in base station memory 318. That is, the same reference block size that was stored in the wireless communication device memory 331 is also stored in the base station memory 318. As noted above with respect to Equation 5, the reference block size is based at least on the quantity of information bits (which may include parity or CRC bits for error correction) for the first type of control information and optionally additionally on the modulation to be used for transmitting the first type of control information.

Storage of the reference block size in the wireless communication device memory 331 may occur at any time prior to use of the wireless communication device 302, such as at time of manufacture or system provisioning. Similarly, storage of the reference block size in the base station memory 318 may occur at any time prior to use of the base station 301, such as at time of manufacture or installation.

In accordance with one embodiment, the base station processor 316 schedules transmission of control information from the wireless communication device 302 by employing the base station transmitter 312 to transmit a scheduling message (e.g., a scheduling grant message or a downlink control information) to the wireless communication device 302 over a downlink control channel, such as a PDCCH in an E-UTRA system. The scheduling message schedules transmission of information from the wireless communication device 302 to the base station 301 over a data channel, such as a PUSCH in an E-UTRA system. In addition to scheduling a transmission time, the scheduling message also includes a resource allocation identifying a set of transmission resources that may be used by the wireless communication device 302 for the data channel transmission. In an E-UTRA system embodiment, the resource allocation may include a bandwidth, a quantity of subcarriers, and a subframe time period from which a quantity of available resource elements may be determined for the transmission. The scheduling message may also identify the modulation to be used by the wireless communication device 302 when transmitting the control information. The scheduling message may further include an express request for downlink channel quality information (e.g. CQI or PMI). Such a channel quality information request may be aperiodic in that it may have been made outside the normal channel quality reporting schedule of the wireless communication device 302.

Responsive to the scheduling message, the base station receiver 314 receives (703) an uplink data channel (e.g., PUSCH) transmission from the wireless communication device 302 containing control channel information of the first type (e.g., channel-coded CQI) and control information of at least one other type (e.g., MIMO rank and/or HARQ-ACK/NACK). Upon receiving the data channel transmission, the base station receiver 314 processes the transmission in accordance with known down-conversion, filtering, and other processes and forwards a baseband version of the received transmission to the base station processor 316. The base station processor 316 determines (705) a quantity or set of the allocated transmission resources used by the wireless communication device 302 to transmit the control information of the second type based on the reference block size, the modulation used for transmission of the control information and the set of allocated resources in the resource allocation provided to the wireless communication device 302. For example, in an E-UTRA system embodiment where the second type of control information is MIMO rank or HARQ-ACK/NACK, the base station processor 316 may utilize Equation 5 above to determine how many resource elements of the received subframe 407 contain the second type of control information. Where both MIMO rank and HARQ-ACK/NACK information are included in the subframe 407 as illustrated in the exemplary subframe 407 of FIG. 5, the base station processor 316 may utilize Equation 5 to determine the quantity of resource elements 501 of the subframe 407 which include each such type of control information.

In addition to determining the quantity of transmission resources used by the wireless communication device 302 to transmit the control information of the second type (and possibly additional types), the base station processor 316 determines (707) the quantity of transmission resources used by the wireless communication device 302 to transmit the control information of the first type based on the reference block size, the resource allocation, the uplink modulation, and the quantity of transmission resources determined to be used for transmission of the second or other type of control information. For example, in an E-UTRA embodiment, the base station processor 316 may, upon determining the quantity of transmission resources (resource elements) used for transmitting the second (and third or more, if included) type of control information, determine the quantity of transmission resources used for transmitting the first type of control information by subtracting the quantity of resource elements in the resource allocation from the quantity of resource elements used for transmitting the control information of the second (and third or more, if included) type, where the resource allocation already excludes all resource elements assigned for transmission of uplink reference symbols. The base station processor 316 knows, at the time of transmitting the scheduling message, whether the received control information subframe 407 is expected to include any HARQ-ACK/NACKs because, as discussed above, the E-UTRA signaling protocol requires each subframe of downlink data transmitted to the wireless communication device 302 to be acknowledged in an uplink subframe transmitted four milliseconds or another predetermined period of time after receipt of the downlink data subframe. As a result, the base station processor 316 knows, at the time of scheduling uplink control transmissions, whether the received control information subframe 407 should include CQI, rank, and/or HARQ-ACK/NACK and can appropriately determine (705, 707) the quantity of resource elements allocated to the respective types of control information based on Equation 5 above. It should be noted that if the wireless communication device 302 missed the downlink data packet that is to be acknowledged on the uplink data channel, the wireless communication device 302 does not multiplex the HARQ-ACK/NACK information and, therefore, the base station 301 may try to decode the CQI resource elements to detect the reception of the expected HARQ-ACK/NACK information.

After the quantities of transmission resources have been determined for the various types of control information, the base station processor 316 demultiplexes (709) the received subframe 407 according to the determined quantities of transmission resources with knowledge of the multiplexing procedure used by the wireless communication device 302. For example, in accordance with an E-UTRA embodiment, the base station processor 316 extracts the rank information (when included) by demultiplexing the determined quantity of rank resource elements from the second, sixth, ninth, and thirteenth SC-FDMA symbols in the same manner as which they were originally multiplexed into the subframe 407 by the wireless communication device processor 329. Analogously, the base station processor 316 extracts the HARQ-ACK/NACK information (when included) by demultiplexing the determined quantity of ACK/NACK resource elements from the third, fifth, tenth, and twelfth SC-FDMA symbols in the same manner as which they were originally multiplexed into the subframe 407 by the wireless communication device processor 329. Finally, the base station processor 316 extracts the channel quality information (channel-coded CQI) by demultiplexing the remaining resource elements from the SC-FDMA symbols other than the reference symbols in the same manner as which they were originally multiplexed into the subframe 407 by the wireless communication device processor 329. Although discussed above with respect demultiplexing the various types of control information resource elements in a particular order, one of ordinary skill in the art will readily recognize that the control information resource elements may be demultiplexed in any order to extract the encoded control information; however, rank information may be decoded first because the CQI block size may be a function of the rank value. Alternatively, one of ordinary skill in the art will recognize that it may be possible to decode CQI hypothesizing all possible CQI block sizes exploiting the CRC redundancy.

After demultiplexing the transmission resources, the base station processor 316 decodes (711) the demultiplexed transmission resources to recover the various types of control information. For example, the base station processor 316 may reassemble the bits for the channel quality, rank and/or ACK/NACK information (depending upon what has been included in the received subframe 407) based upon or taking into account the coding performed on such bits by the wireless communication device 302 according to Equation 5 above. If the control information bits have not been channel-coded, reassembly of the bits will produce the transmitted control information of those particular types. If channel coding was employed, the base station processor 316 utilizes the appropriate error-correction decoding routine to recover the transmitted control information.

Figure 6:
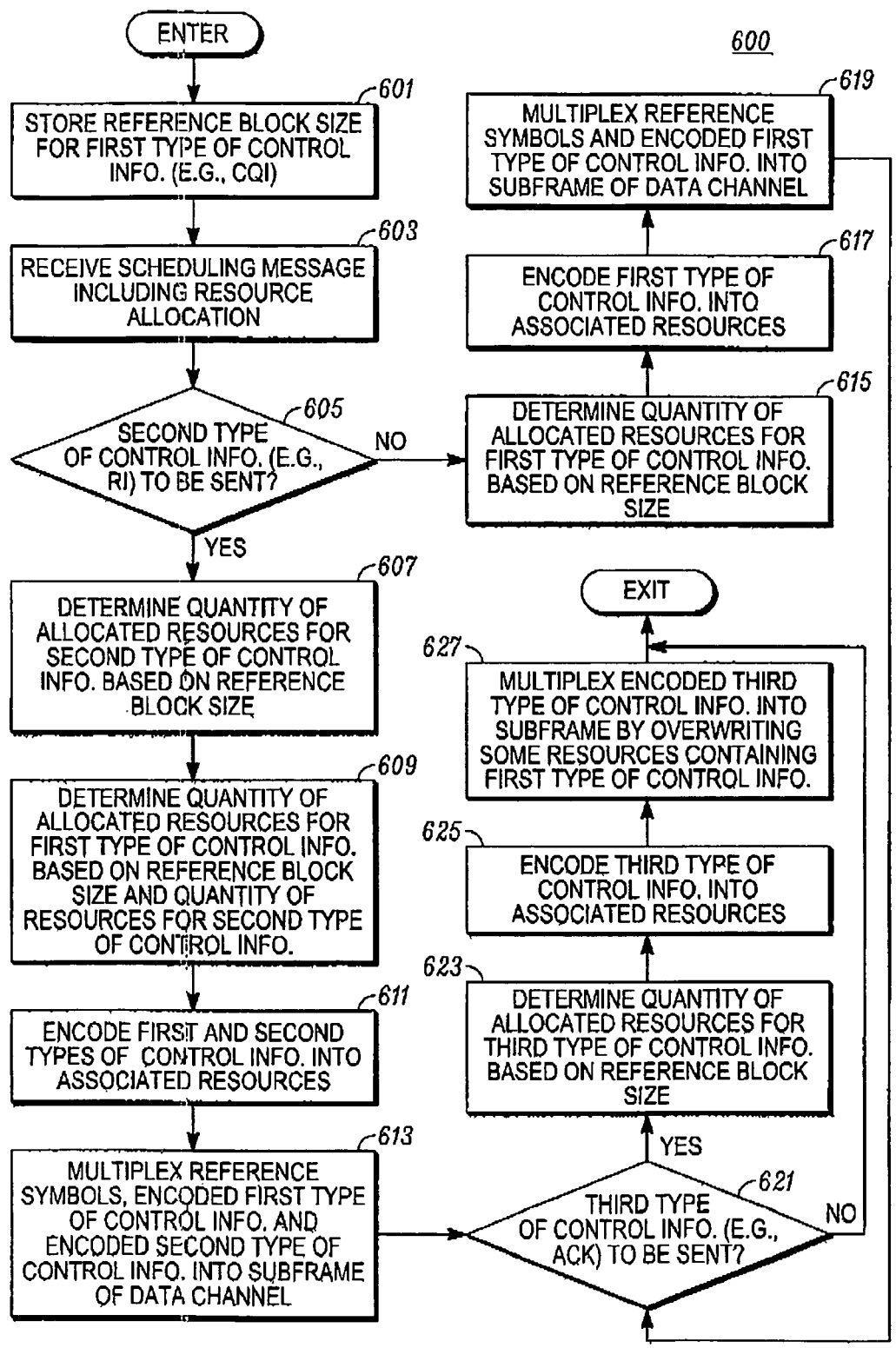
FIG. 6 is a logic flow diagram of steps executed by a wireless communication device to prepare control information for transmission over a data channel in the absence of user data, in accordance with an exemplary embodiment of the present invention.

The instructions illustrated in FIG. 6 for controlling operation of the wireless device processor 329 may be implemented as programming instructions, which are stored in wireless device memory 331 and executed at appropriate times by the wireless device processor 329. Similarly, the instructions illustrated in FIG. 7 for controlling operation of the base station processor 316 may be implemented as programming instructions, which are stored in base station memory 318 and executed at appropriate times by the base station processor 316.

The present invention encompasses an apparatus and method for transmitting control information over a data channel in the absence of user data. With this invention, various types of control information may be transmitted over a PUSCH in an E-UTRA or UMTS LTE system even though no data MCS has been provided by the base station. To overcome the absence of a data MCS when no user data is scheduled for transmission together with the control information over a data channel, the present invention utilizes a reference block size together with the base station's resource allocation to effectively create a reference MCS against which coding rates for various types of control information can be determined and used to convey the control information in subframes over the data channel. While the foregoing description focuses on the transmission of an uplink data channel subframe 407 by a single wireless communication device 302, one of ordinary skill in the art will readily recognize that the wireless communication device 302 may be transmitting in a portion of the uplink subframe in frequency resources assigned in the resource allocation. It should be additionally noted that there may be other wireless communication devices in the cell or coverage range of the base station 301 that may be concurrently transmitting in the same subframe on other frequency resources. It should be further noted that while the exemplary subframe embodiment assumes a particular uplink subframe structure (e.g., a normal Cyclic Prefix with 14 SC-FDMA symbols in a resource block), the present invention is equally applicable to other uplink subframe structures, such as the extended Cyclic Prefix structure that has 12 SC-FDMA symbols in a resource block and the TDD mode, wherein the uplink and downlink subframe configurations may be one of several possible configurations as provided in the E-UTRA standard. The present invention is further applicable to an OFDM uplink transmission scheme and/or an uplink multiple antenna transmission scheme.

As detailed above, embodiments of the present invention reside primarily in combinations of method steps and apparatus components related to communicating control information over a data channel in the absence of user data. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," and any other variations thereof are intended to cover a non-exclusive inclusion, such that a process, method, article, or apparatus that comprises a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the base station 301 and the wireless communication device 302 described herein may be comprised of one or more conventional processors and unique stored program instructions that control the processor(s) to implement, in conjunction with certain non-processor circuits, some, most, or all of the functions of the base station 301 and the wireless communication device 302 and their operational methods as described herein. The non-processor circuits may include, but are not limited to, the transmitters 312, 325, the receivers 314, 327, the antennas 304-307, 39-310, 320, 322-323, the display 333, the user interface 335, memory 318, 331, and the alerting mechanism 337 described above, as well as filters, signal drivers, clock circuits, power source circuits, user input devices, and various other non-processor circuits. As such, the functions of these non-processor circuits may be interpreted as steps of a method in accordance with one or more embodiments of the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A multiple input and multiple output (MIMO) capable wireless communication device comprising:
   memory operable to store a reference block size for transmission of control information of a first type, the reference block size being based at least on a predetermined quantity of information bits for the first type of control information,
   the first type of control information is channel quality information for at least one downlink channel, the predetermined quantity of information bits for the first type of control information is equal to a quantity of channel quality information bits assuming a reference rank value, and the quantity of channel quality information bits includes error correction bits;
   a receiver operable to receive a scheduling message including a resource allocation indicator and a request for control information of the first type, the resource allocation indicator identifying a set of transmission resources for transmitting control information;
   a processor coupled to the receiver and the memory,
   the processor operable to determine whether control information of a second type is to be sent, control information of the second type being different than control information of the first type;
   the processor operable to determine, based on the reference block size, a second quantity of transmission resources from the set of transmission resources, the second quantity of transmission resources for use in transmitting the control information of the second type;
   the processor operable to encode the control information of the second type; and
   a transmitter operably coupled to the processor and operable to transmit the encoded control information of the second type using the second quantity of transmission resources over a data channel in an absence of data to send over the data channel.

2. The wireless communication device of claim 1, wherein the scheduling message excludes instructions for determining transmission resources of the set of transmission resources for use in transmitting the control information of the second type.

3. The wireless communication device of claim 1, wherein the processor is further operable to:
   determine, based on the reference block size and the second quantity of transmission resources, a first quantity of transmission resources from the set of transmission resources for use in tra nsmitting control information of the first type;
   encode the control information of the first type; and
   multiplex the encoded control information of the second type using the second quantity of transmission resources and multiplex the encoded control information of the first type using the first quantity of transmission resources;
   wherein the transmitter is operable to transmit the encoded control information over the data channel after multiplexing.

4. The wireless communication device of claim 3, wherein the data channel is an uplink data channel, wherein the set of transmission resources is arranged in accordance with single-carrier frequency division multiple access (SC-FDMA) uplink signaling such that the set of transmission resources are divided in time across a plurality of contiguous subcarriers occupying a predetermined bandwidth, wherein each transmission resource of the set of transmission resources is a resource element occupying a predetermined amount of time on one of the subcarriers, wherein the subframe includes a plurality of time-contiguous SC-FDMA symbols, wherein each SC-FDMA symbol includes of a plurality of time contemporaneous resource elements occupying the predetermined bandwidth, wherein the first quantity of transmission resources cooresponds to a first set of resource elements, wherein the second quanity of transmission resources cooresponds to a second set of resource elements, and
   wherein the processor is operable to multiplex the encoded control information of the second type using the second quantity of transmission resources and to multiplex the encoded control information of the first type using the first quantity of transmission resources by at least:
   multiplexing the encoded control information of the first type into a first plurality of SC-FDMA symbols, wherein multiplexing of the first set of resource elements is commenced at a first edge of the predetermined bandwidth; and
   multiplexing the encoded control information of the second type into a second plurality of SC-FDMA symbols, wherein multiplexing of the second set of resource elements is commenced at a second, opposite edge of the predetermined bandwidth.

5. The wireless communication device of claim 4, wherein the processor is further operable to:
   multiplex at least one reference symbol into the subframe;
   wherein the encoded control information of the first type and the encoded control information of the second type are multiplexed into SC-FDMA symbols that are different than the at least one reference symbol.

6. The wireless communication device of claim 4, wherein the control information of the first type is channel quality information for at least one downlink channel, wherein the control information of the second type is a rank value, and wherein the processor is operable to multiplex encoded control information of the second type using the second quantity of transmission resources and the encoded control information of the first type using the first quantity of transmission resourses by at least:
   multiplexing the encoded control information of the first type into the first plurality of SC-FDMA symbols and multiplexing the encoded control information of the second type into the second plurality of SC-FDMA symbols.

7. The wireless communication device of claim 4, wherein the control information of the first type is channel quality information for at least one downlink channel, wherein the control information of the second type includes at least one hybrid automatic repeat request acknowledgement, and wherein the processor is operable to multiplex encoded control information of the second type using the second quantity of transmission resources and multiplex the encoded control information of the first type using the first quantity of transmission resources by at least:

multiplexing the encoded control information of the first type into the first plurality of SC-FDMA symbols and multiplexing the encoded control information of the second type into the second plurality of SC-FDMA symbols.

8. The wireless communication device of claim 7, wherein at least some of the first plurality of SC-FDMA symbols are identical to at least some of the second plurality of SC-FDMA symbols and wherein multiplexing the encoded control information of the second type into the second plurality of SC-FDMA symbols results in overwriting of at least some of the first set of resource elements by at least some of the second set of resource elements.

9. The wireless communication device of claim 4, wherein a quantity of the second plurality of SC-FDMA symbols is less than or equal to a predetermined quantity of SC-FDMA symbols.

10. The wireless communication device of claim 1, wherein the processor is further operable to:
determine whether control information of a third type is to be sent responsive to the scheduling message, control information of the third type being different than control information of the first type and control information of the second type;
in the event that control information of the third type is to be sent, determine, based on the reference block size, a third quantity of transmission resources from the set of transmission resources for use in transmitting the control information of the third type;
encode the control information of the third type; and
multiplex the encoded control information of the second type using the second quantity of transmission resources and multiplexing the encoded control information of the third type using the third quantity of transmission resources.

11. The wireless communication device of claim 10, wherein control information of the first type is channel quality information representing a channel quality of at least one downlink channel, wherein control information of the second type is a rank value, and wherein control information of the third type is at least one hybrid automatic repeat request acknowledgment (HARQ-ACK).

12. The wireless communication device of claim 1, wherein the reference rank value is greater than one.

13. The wireless communication device of claim 1, wherein the reference rank value antenna system is one.

14. The wireless communication device of claim 1, wherein the processor is further operable to determine a block size for control information of the first type based on the control information of the second type.

15. The wireless communication device of claim 14, wherein the block size for control information of the first type is different than the reference block size.

16. A base station operable to receive control information over an uplink data channel in an absence of data sent over the uplink data channel, the base station comprising:
a transmitter operable to transmit a scheduling message that includes a resource allocation and a request for control information of a first type, the resource allocation identifying a set of transmission resources for transmitting control information;
memory operable to store a reference block size for control information of a first type, the reference block size being based at least on a predetermined quantity of information bits for the control information of the first type, wherein the control information of the first type is channel quality information for at least one downlink channel, the predetermined quantity of information bits for the control information of the first type is equal to a quantity of channel quality information bits assuming a reference rank value, the quantity of channel quality information bits includes error correction bits;
a receiver operable to receive a transmission over the uplink data channel, the transmission including at least control information of the first type and control information of a second type;
a processor operably coupled to the receiver and the memory, the processor operable to:
determine, based on the reference block size, a first quantity of transmission resources of the set of transmission resources used to transmit the control information of the second type;
determine, based on the reference block size, a second quantity of transmission resources of the set of transmission resources used to transmit the control information of the first type;
demultiplex a subframe of the transmission according to the first quantity of transmission resources and the second quantity of transmission resources to obtain a first quantity of received resources and a second quantity of received resources, respectively;
decode the first quantity of received resources to recover the control information of the first type; and
decode the second quantity of received resources to recover the control information of the second type.

17. A method for a multiple input and multiple output (MIMO) capable wireless communication device to prepare control information for transmission over an uplink data channel in the absence of data to be sent by the wireless communication device, the method comprising:
storing a reference block size for transmitting a downlink channel quality indicator (CQI), the reference block size being based at least on a predetermined quantity of information bits for forming the CQI, the channel quality indicator for at least one downlink channel, the predetermined quantity of information bits for the first type of control information is equal to a quantity of channel quality information bits assuming a reference rank value, and the quantity of channel quality information bits includes error correction bits;
receiving a scheduling message, the scheduling message including a resource allocation indicator and a request for CQI, the resource allocation indicator identifying a set of resource elements allocated for transmitting control information, wherein the set of resource elements is arranged in accordance with single-carrier frequency division multiple access (SC-FDMA) uplink signaling such that the set of resource elements are divided in time across a plurality of contiguous subcarriers occupying a predetermined bandwidth, each resource element of the set of resource elements occupying a predetermined amount of time on one of the subcarriers;
determining the auxiliary control information is to be sent the auxiliary control information including at least one of a hybrid automatic repeat request acknowledgment (HARQ-ACK) and a rank value;
determining, based on the reference block size, a first quantity of resource elements from the set of resource elements for use in transmitting the auxiliary control information;
determining, based on the reference block size a quantity of resource elements from the set of resource elements for use in transmitting the CQI;
encoding the auxiliary control information;

encoding the CQI; and multiplexing the encoded auxiliary control information and the encoded CQI into a subframe of the uplink data channel, wherein the subframe includes a plurality of time contiguous SC-FDMA symbols and wherein each SC-FDMA symbol includes of a plurality of time contemporaneous resource elements occupying the predetermined bandwidth.

18. The method of claim 17, wherein the auxiliary control information is a rank indicator.

19. The method of claim 18, wherein the step of multiplexing the first set of resource elements and the second set of resource elements into a subframe of the uplink data channel comprises:

multiplexing at least one SC-FDMA reference symbol into the subframe, the at least one SC-FDMA reference symbol being usable for at least one of demodulation and determining uplink channel quality, wherein the reference block size takes into account resource elements expected to be occupied by the at least one SC-FDMA reference symbol;

subsequent to multiplexing the at least one SC-FDMA reference symbol into the subframe, multiplexing the encoded rank indicator is commenced at a first edge of the predetermined bandwidth and wherein the first plurality of SC-FDMA symbols excludes the at least one SC-FDMA reference symbol;

subsequent to multiplexing the encoded rank indicator into the subframe, multiplexing the encoded CQI into a second plurality of SC-FDMA symbols, wherein multiplexing of the encodeing CQI is commenced at a second, opposite edge of the predetermined bandwidth and wherein the second plurality of SC-FDMA symbols excludes the at least one SC-FDMA reference symbol.

20. A multiple input and multiple output (MIMO) capable wireless communication terminal comprising:

a transceiver a processor coupled to the transceiver;

memory coupled to the processor, the memory storing a reference block size based on a quantity of channel quality information bits assuming a reference rank value, wherein the quantity of channel quality information bits includes error correction bits, the processor configured to determine, based on the reference block size, a quantity of transmission resources from a set of transmission resources, the quantity of transmission resources for use in transmitting control information other than the channel quality information, the processor configured to encode the control information, and the processor configured to cause the transceiver to transmit the encoded control information using the quantity of transmission resources over a data channel in an absence of data on the data channel.

\* \* \* \* \*